United States Patent
Chuang

(10) Patent No.: US 9,723,652 B2
(45) Date of Patent: Aug. 1, 2017

(54) DEVICE AND METHOD OF HANDLING CELL RESELECTION

(71) Applicant: ACER INCORPORATED, New Taipei (TW)

(72) Inventor: Ming-Dao Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/985,332

(22) Filed: Dec. 30, 2015

(65) Prior Publication Data
US 2016/0316413 A1    Oct. 27, 2016

Related U.S. Application Data

(60) Provisional application No. 62/152,030, filed on Apr. 23, 2015.

(51) Int. Cl.
| | |
|---|---|
| H04W 36/00 | (2009.01) |
| H04W 76/04 | (2009.01) |
| H04W 72/04 | (2009.01) |
| H04J 11/00 | (2006.01) |
| H04W 48/16 | (2009.01) |
| H04W 88/02 | (2009.01) |
| H04W 36/08 | (2009.01) |
| H04W 48/20 | (2009.01) |

(52) U.S. Cl.
CPC ........... *H04W 76/048* (2013.01); *H04J 11/00* (2013.01); *H04W 48/16* (2013.01); *H04W 72/0446* (2013.01); *H04W 36/08* (2013.01); *H04W 48/20* (2013.01); *H04W 88/02* (2013.01)

(58) Field of Classification Search
USPC .......................................... 455/437
See application file for complete search history.

(56) References Cited

U.S. PATENT DOCUMENTS

2011/0183663 A1*  7/2011  Kenehan ............. H04W 76/048
                                                              455/423
2014/0321343 A1* 10/2014  Gupta ............... H04W 36/0066
                                                              370/311

FOREIGN PATENT DOCUMENTS

| EP | 2 453 595 A1 | 5/2012 |
|---|---|---|
| WO | 2013147665 A1 | 10/2013 |

OTHER PUBLICATIONS

Acer Incorporated et al., Issue for eDRX, SA WG2 Meeting #108, Apr. 13-17, 2015, pp. 1-2, S2-151230, XP050962535, San Jose Del Cabo, Mexico.
Acer Incorporated, Extended DRX impact on idle mode UE measurement and cell reselection, 3GPP TSG-RAN WG2 Meeting #91, Aug. 24-28, 2015, R2-153083, XP051003897, Beijing, China.
(Continued)

*Primary Examiner* — Joel Ajayi
(74) *Attorney, Agent, or Firm* — Winston Hsu

(57) ABSTRACT

A communication device for handling a cell reselection comprises a storage unit for storing instructions and a processing means coupled to the storage unit. The processing means is configured to execute the instructions stored in the storage unit. The instructions comprise performing a measurement on at least one cell one time in an extended discontinuous reception (eDRX) cycle to obtain a measurement result; stopping performing at least one layer filtering mechanism on the measurement result; and transmitting the measurement result to a network.

12 Claims, 5 Drawing Sheets

(56) References Cited

OTHER PUBLICATIONS

3rd Generation Partnership Project, "Technical Specification Group Services and System Aspects; Study on System Impacts of Extended DRX Cycle for Power Consumption Optimization; (Release 13)", 3GPP TR 23.770 V0. 1. 0, pp. 8-9, 17-20, Feb. 2015.
3rd Generation Partnership Project, "Technical Specification Group Radio Access Network; Requirements for support of radio resource management (FDD) (Release 12)", 3GPP TS 25. 133 V12. 7. 0, pp. 23-25, 28, Mar. 2015.

* cited by examiner

DEVICE AND METHOD OF HANDLING CELL RESELECTION

CROSS REFERENCE TO RELATED APPLICATIONS

This application claims the benefit of U.S. Provisional Application No. 62/152,030, filed on Apr. 23, 2015 and incorporated herein by reference.

BACKGROUND OF THE INVENTION

1. Field of the Invention

The present invention relates to a communication device and a method used in a wireless communication system, and more particularly, to a communication device and a method of handling a cell reselection in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

The UE may measure cell(s) in each paging cycle to obtain a measurement result, when the UE is in an idle mode. Then, the UE may perform a cell reselection operation according to the measurement result. However, a time interval between time instants for obtaining two measurement results may be too long, when the UE uses an extended discontinuous reception (eDRX). For example, an eDRX cycle (e.g., 5 minutes) may be greater than an original maximum paging cycle (e.g., 2.56 seconds). That is, previous measurement results may be obtained 5 minutes ago, when the measurement result is obtained in the eDRX cycle. Thus, the previous measurement results may be useless or outdated for the cell reselection operation.

Thus, how to modify existing cell reselection operation is an important topic to be discussed.

SUMMARY OF THE INVENTION

The present invention therefore provides a communication device and a method for handling a cell reselection to solve the abovementioned problem.

A communication device for handling a cell reselection comprises a storage unit for storing instructions and a processing means coupled to the storage unit. The processing means is configured to execute the instructions stored in the storage unit. The instructions comprise performing a measurement on at least one cell onetime in an extended discontinuous reception (eDRX) cycle to obtain a measurement result; stopping performing at least one layer filtering mechanism on the measurement result; and transmitting the measurement result to a network.

A communication device for handling a cell reselection comprises a storage unit for storing instructions and a processing means coupled to the storage unit. The processing means is configured to execute the instructions stored in the storage unit. The instructions comprise performing a measurement on a serving cell in an extended discontinuous reception (eDRX) cycle to obtain a measurement result; determining whether the measurement result fulfills a cell selection criterion; and measuring at least one neighbor cell, if the measurement result is determined not to fulfill the cell selection criterion one time.

A communication device for handling a cell reselection comprises a storage unit for storing instructions and a processing means coupled to the storage unit. The processing means is configured to execute the instructions stored in the storage unit. The instructions comprise performing a measurement on at least one neighbor cell in an extended discontinuous reception (eDRX) cycle to obtain at least one measurement result of the at least one neighbor cell, when the communication device camps on a serving cell; deleting at least one time interval for evaluating the at least one measurement result; determining whether the at least one measurement result fulfills a cell reselection criteria; and performing a cell reselection for transferring from the serving cell to a neighbor cell of the at least one neighbor cell, if a measurement result of the neighbor cell is determined to fulfill the cell reselection criteria.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
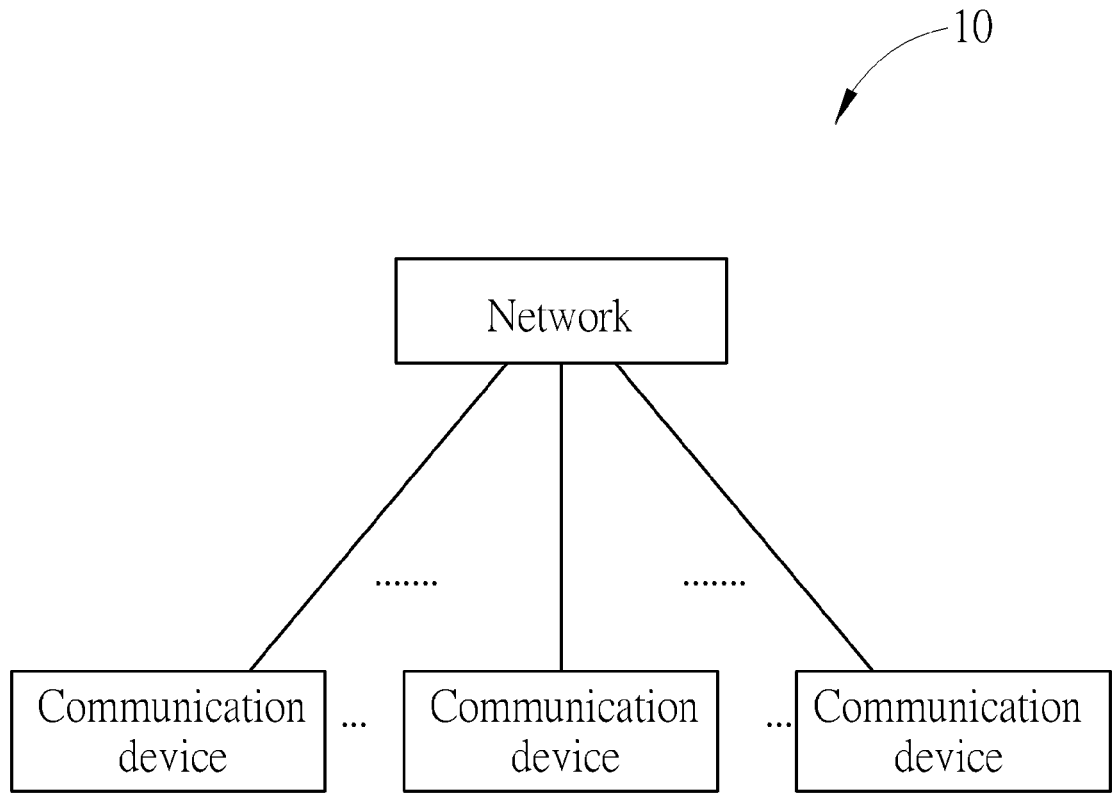
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising at least one Node-B (NB) in a universal mobile telecommunications system (UMTS). In another example, the network can be an evolved UTRAN (E-UTRAN) comprising at least one evolved NB (eNB) and/or at least one relay in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a device-to-device (D2D) device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
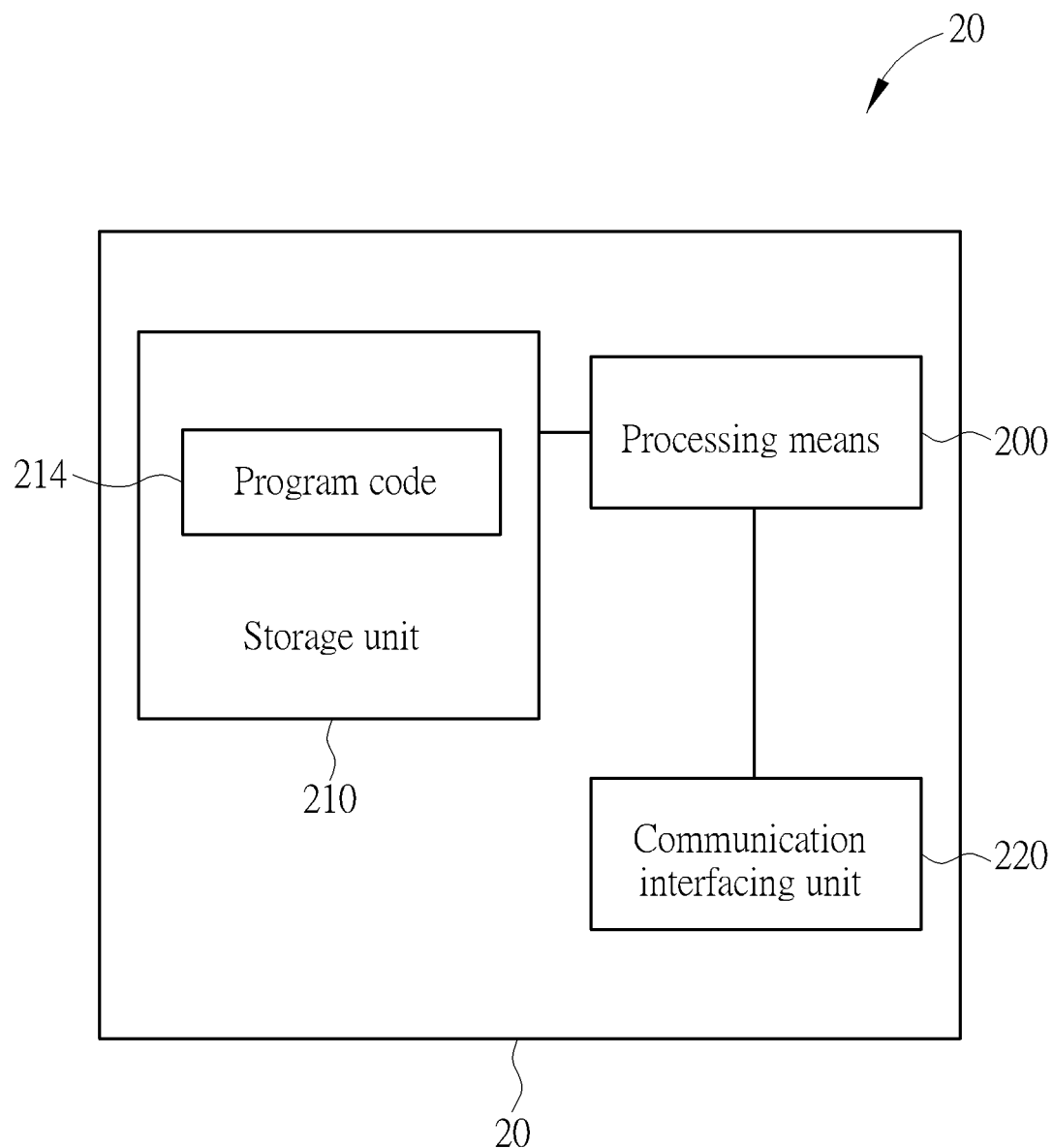
FIG. 2 is a schematic diagram of a communication device according to an example of the present invention.

FIG. 2 is a schematic diagram of a communication device 20 according to an example of the present invention. The communication device 20 may be the communication device, the network NET1 and/or the network NET2 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
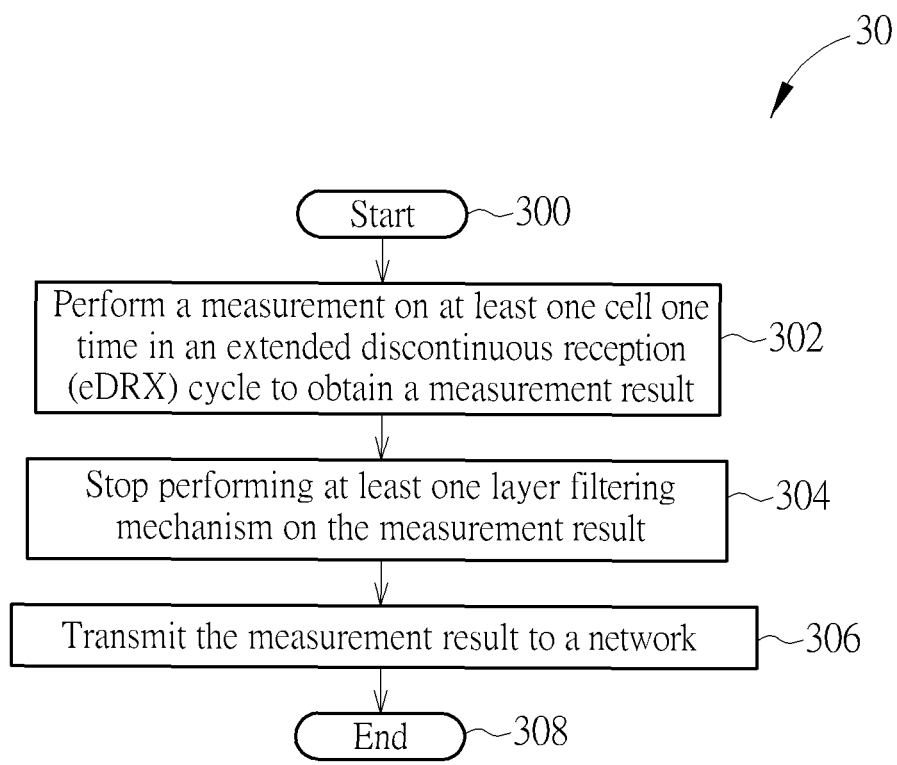
FIG. 3 is a flowchart of a process according to an example of the present invention.

FIG. 3 is a flowchart of process 30 according to an example of the present invention. The process 30 may be utilized in a communication device (e.g., UE) in FIG. 1, to handle a cell reselection. The process 30 may be compiled into the program code 214 and includes the following steps:

Step 300: Start.

Step 302: Perform a measurement on at least one cell one time in an extended discontinuous reception (eDRX) cycle to obtain a measurement result.

Step 304: Stop performing at least one layer filtering mechanism on the measurement result.

Step 306: Transmit the measurement result to a network.

Step 308: End.

According to the process 30, the communication device may perform a measurement on at least one cell one time in an eDRX cycle to obtain a measurement result. The communication device may stop performing at least one layer filtering mechanism on the measurement result. Then, the communication device may transmit the measurement result to a network. That is, the at least one layer filtering mechanism may not be needed (e.g., used), after the measurement result is obtained (e.g., measured) in the eDRX cycle. Thus, the communication device does not wait for filtering multiple measurement results, and the measurement result may be transmitted immediately.

Realization of the present invention is not limited to the above description. The following example may be applied to the process 30.

In one example, the eDRX cycle in the process 30 may be greater than a predetermined time period. For example, the eDRX cycle may be 5 minutes and the predetermined time period may be 10 seconds. That is, the effect of the long eDRX cycle on the measurement result can be avoided according to the process 30. In one example, the at least one layer filtering mechanism may include a layer 1 filtering mechanism and/or a layer 3 filtering mechanism. That is, the communication device may stop using the layer 1 filtering mechanism or the layer 3 filtering mechanism on the measurement result. The communication device may stop using both the layer 1 filtering mechanism and the layer 3 filtering mechanism on the measurement result. In one example, the communication device may stop performing the at least one layer filtering mechanism by setting a parameter filterCoefficient for the eDRX cycle to zero. For example, the layer 3 filtering mechanism may be stopped by setting the parameter filterCoefficient k to zero in a filtering equation of the layer 3 filtering mechanism. In one example, the at least one cell in the process 30 may include a serving cell or at least one neighbor cell. Further, the at least one cell in the process 30 may include the serving cell and the at least one neighbor cell.

As a result, according to the above description, the communication device may stop the at least one layer filtering mechanism such that the measurement result can be used efficiently for the cell reselection, when the measurement result is obtain in the eDRX cycle. Thus, the inefficient usage of the measurement result due to the long eDRX cycle for the cell reselection operation is solved.

Figure 4:
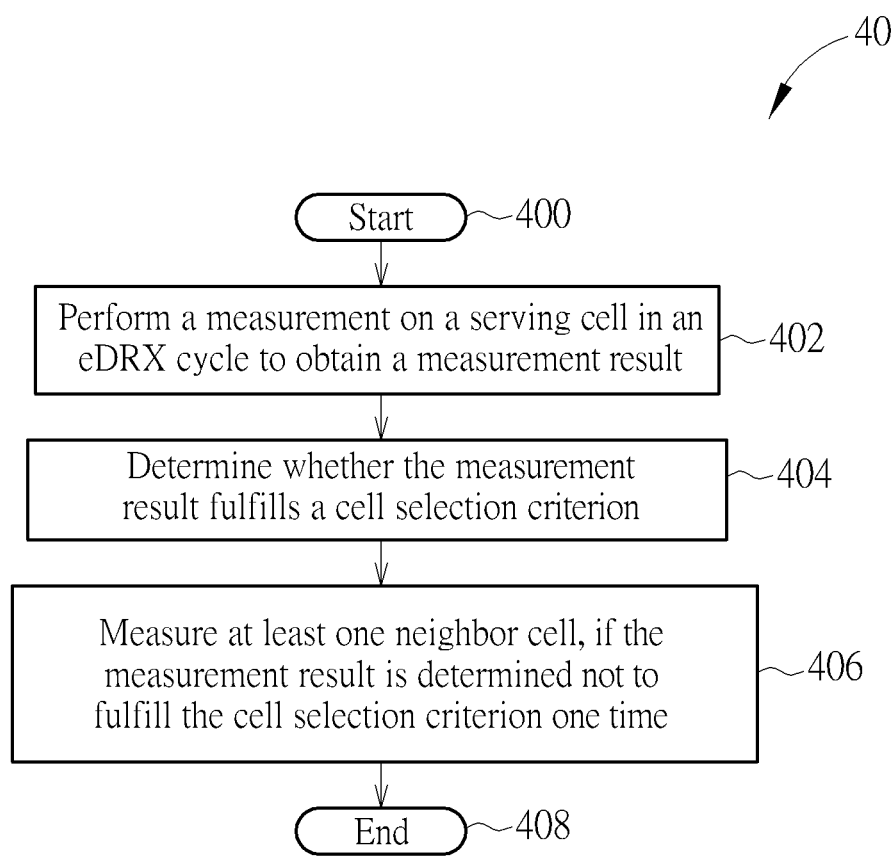
FIG. 4 is a flowchart of a process according to an example of the present invention.

FIG. 4 is a flowchart of process 40 according to an example of the present invention. The process 40 may be utilized in a communication device (e.g., UE) in FIG. 1, to handle a cell reselection. The process 40 may be compiled into the program code 214 and includes the following steps:

Step 400: Start.

Step 402: Perform a measurement on a serving cell in an eDRX cycle to obtain a measurement result.

Step 404: Determine whether the measurement result fulfills a cell selection criterion.

Step 406: Measure at least one neighbor cell, if the measurement result is determined not to fulfill the cell selection criterion one time.

Step 408: End.

According to the process 40, the communication device may perform a measurement on a serving cell in an eDRX cycle to obtain a measurement result. The communication device may determine whether the measurement result fulfills a cell selection criterion. Then, the communication device may measure at least one neighbor cell, if the measurement result is determined not to fulfill the cell selection criterion one time. That is, the at least one neighbor cell may be measured immediately, if a single measurement result of the serving cell does not fulfill the cell selection criterion one time. In other words, a single eDRX cycle is used for determining whether the measurement result fulfills the cell selection criterion.

Realization of the present invention is not limited to the above description. The following example may be applied to the process 40.

In one example, the eDRX cycle in the process 40 may be greater than a predetermined time period. For example, the eDRX cycle may be 5 minutes and the predetermined time period may be 10 seconds. That is, the effect of the long eDRX cycle on the measurement result can be avoided according to the process 40. In one example, the communication device may determine whether the measurement result fulfills the cell selection criterion by setting a parameter $N_{serv}$ for the eDRX cycle to 1. The parameter $N_{serv}$ is a number of eDRX cycles. That is, a measurement result in a single eDRX cycle is used for determining whether the measurement result fulfills the cell selection criterion, and the communication device does no need to wait for multiple eDRX cycles. In one example, the cell selection criterion may include a cell selection criterion S.

As a result, according to the above description, the communication device may measure the at least one neighbor cell, if the measurement result of the serving cell in the eDRX cycle does not fulfill the cell selection criterion. Thus, the inefficient usage of the measurement result due to the long eDRX cycle for the cell reselection operation is solved.

Figure 5:
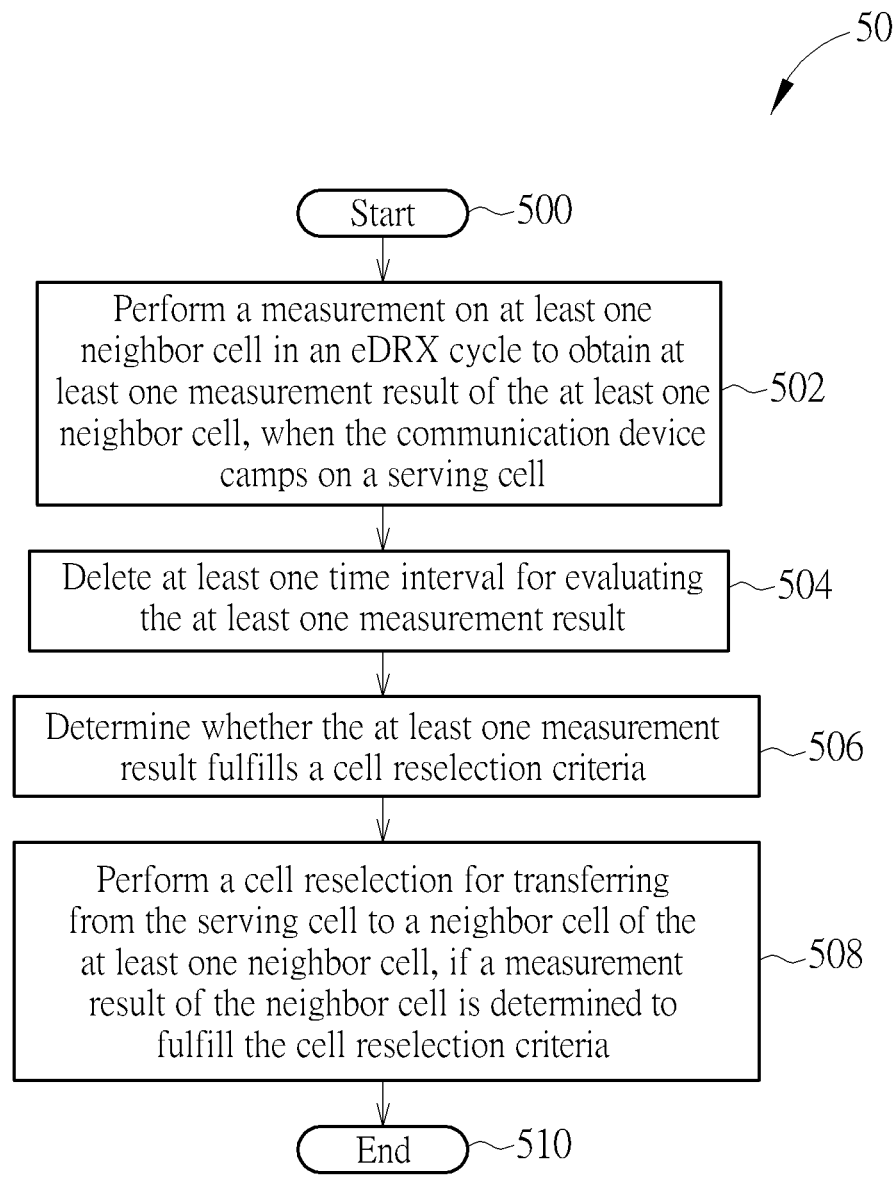
FIG. 5 is a flowchart of a process according to an example of the present invention.

FIG. 5 is a flowchart of process 50 according to an example of the present invention. The process 50 may be utilized in a communication device (e.g., UE) in FIG. 1, to handle a cell reselection. The process 50 may be compiled into the program code 214 and includes the following steps:

Step 500: Start.

Step 502: Perform a measurement on at least one neighbor cell in an eDRX cycle to obtain at least one measurement result of the at least one neighbor cell, when the communication device camps on a serving cell.

Step 504: Delete at least one time interval for evaluating the at least one measurement result.

Step 506: Determine whether the at least one measurement result fulfills a cell reselection criteria.

Step 508: Perform a cell reselection for transferring from the serving cell to a neighbor cell of the at least one neighbor cell, if a measurement result of the neighbor cell is determined to fulfill the cell reselection criteria.

Step 510: End.

According to the process 50, the communication device may perform a measurement on at least one neighbor cell in an eDRX cycle to obtain at least one measurement result of the at least one neighbor cell, when the communication device camps on (e.g., is served by) a serving cell. The communication device may delete at least one time interval for evaluating the at least one measurement result. Then, the communication device may determine whether the at least one measurement result fulfills cell reselection criteria. The communication device may perform a cell reselection for transferring from the serving cell to a neighbor cell of the at least one neighbor cell, if a measurement result of the neighbor cell is determined to fulfill the cell reselection criteria. That is, the communication device may reselect the neighbor cell immediately, if the measurement result of the measured neighbor cell in the eDRX cycle fulfills the cell selection criteria.

Realization of the present invention is not limited to the above description. The following example may be applied to the process 50.

In one example, the eDRX cycle in the process 50 may be greater than a predetermined time period. For example, the eDRX cycle may be 5 minutes and the predetermined time period may be 10 seconds. That is, the effect of the long eDRX cycle on the measurement result can be avoided according to the process 50. In one example, the at least one timer may include a time interval $T_{reselection}$, a time interval $T_{evaluate,E-UTRAN\_Intra}$, a time interval $T_{detect,EUTRAN\_Intra}$, a time interval $T_{reselection}RAT$, a time interval $T_{evaluate,E-UTRAN\_Inter}$ and/or a time interval $T_{detect,EUTRAN\_Inter}$. That is, the communication device may delete the time interval $T_{reselection}$, the time interval $T_{evaluate,E-UTRAN\_Intra}$, and the time interval $T_{detect,EUTRAN\_Intra}$ in an intra-frequency cell reselection criteria. The communication device may delete the time interval $T_{reselection}RAT$, the time interval $T_{evaluate,E-UTRAN\_Inter}$ and the time interval $T_{detect,EUTRAN\_Inter}$ in an inter-frequency cell reselection criteria.

As a result, according to the above description, the communication device may reselect the neighbor cell immediately by deleting the abovementioned interval(s), if the measurement result of the serving cell in the eDRX cycle fulfills the cell reselection criteria. Thus, the inefficient usage of the measurement result because of the long eDRX cycle for the cell reselection operation is solved.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and a method for handling a cell reselection. The communication device does not perform at least one filtering mechanism for multiple measurement results, and transmits a single measurement result to a network immediately. A single eDRX cycle is used for determining whether the measurement result fulfills the cell selection criterion, and at least one neighbor cell may be measured immediately according to the determination. A single eDRX cycle is used for determining whether the measurement result fulfills the cell reselection criteria, and a cell reselection may be performed immediately according to the determination. Thus, the inefficient usage of a measurement result due to an eDRX cycle in the cell reselection operation is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a cell reselection, comprising:
   a storage unit, for storing instructions of:
   performing a measurement on at least one cell one time in an extended discontinuous reception (eDRX) cycle to obtain a measurement result;
   stopping performing at least one layer filtering mechanism on the measurement result, when the measurement result is obtained in the eDRX cycle; and
   transmitting the measurement result to a network;
   wherein the network comprises at least one Node-B (NB) or at least one evolved NB (eNB); and
   a processing means, coupled to the storage unit, configured to execute the instructions stored in the storage unit.

2. The communication device of claim 1, wherein the eDRX cycle is greater than a predetermined time period.

3. The communication device of claim 1, wherein the at least one layer filtering mechanism comprises a layer 1 filtering mechanism and/or a layer 3 filtering mechanism.

4. The communication device of claim 1, wherein the communication device stops performing the at least one layer filtering mechanism by setting a parameter filterCoefficient for the eDRX cycle to zero.

5. The communication device of claim 1, wherein the at least one cell comprises a serving cell and/or at least one neighbor cell.

6. A communication device for handling a cell reselection, comprising:
   a storage unit, for storing instructions of:
   performing a measurement on a serving cell in an extended discontinuous reception (eDRX) cycle to obtain a measurement result;
   determining whether the measurement result fulfills a cell selection criterion; and
   measuring at least one neighbor cell, when the measurement result is determined not to fulfill the cell selection criterion one time; and
   a processing means, coupled to the storage unit, configured to execute the instructions stored in the storage unit.

7. The communication device of claim 6, wherein the eDRX cycle is greater than a predetermined time period.

8. The communication device of claim 6, wherein the communication device determines whether the measurement result fulfills the cell selection criterion by setting a parameter $N_{serv}$ for the eDRX cycle to 1.

9. The communication device of claim 6, wherein the cell selection criterion comprises a cell selection criterion S.

10. A communication device for handling a cell reselection, comprising:
    a storage unit, for storing instructions of:
    performing a measurement on at least one neighbor cell in an extended discontinuous reception (eDRX) cycle to obtain at least one measurement result of the at least one neighbor cell, when the communication device camps on a serving cell;
    deleting at least one time interval for evaluating the at least one measurement result;
    determining whether the at least one measurement result fulfills a cell reselection criteria; and
    performing a cell reselection for transferring from the serving cell to a neighbor cell of the at least one neighbor cell, if when a measurement result of the neighbor cell is determined to fulfill the cell reselection criteria; and
    a processing means, coupled to the storage unit, configured to execute the instructions stored in the storage unit.

11. The communication device of claim 10, wherein an eDRX cycle is greater than a predetermined time period.

12. The communication device of claim 10, wherein the at least one time interval comprises a time interval $T_{reselection}$, a time interval $T_{evaluate,E-UTRAN\_Intra}$ a time interval $T_{detect,EUTRAN\_Intra}$, a time interval $T_{reselection}RAT$, a time interval $T_{evaluate,E-UTRAN\_Inter}$ and/or a time interval $T_{detect,EUTRAN\_Inter}$.

* * * * *